UNITED STATES PATENT OFFICE.

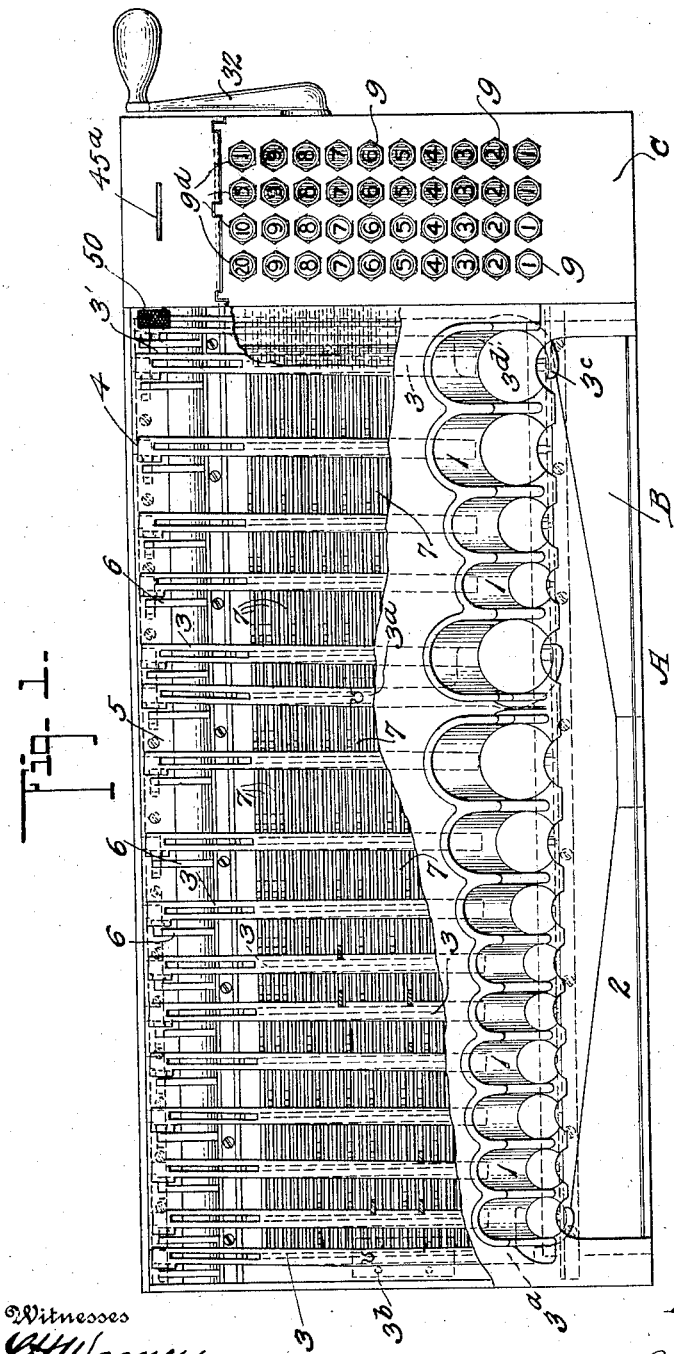

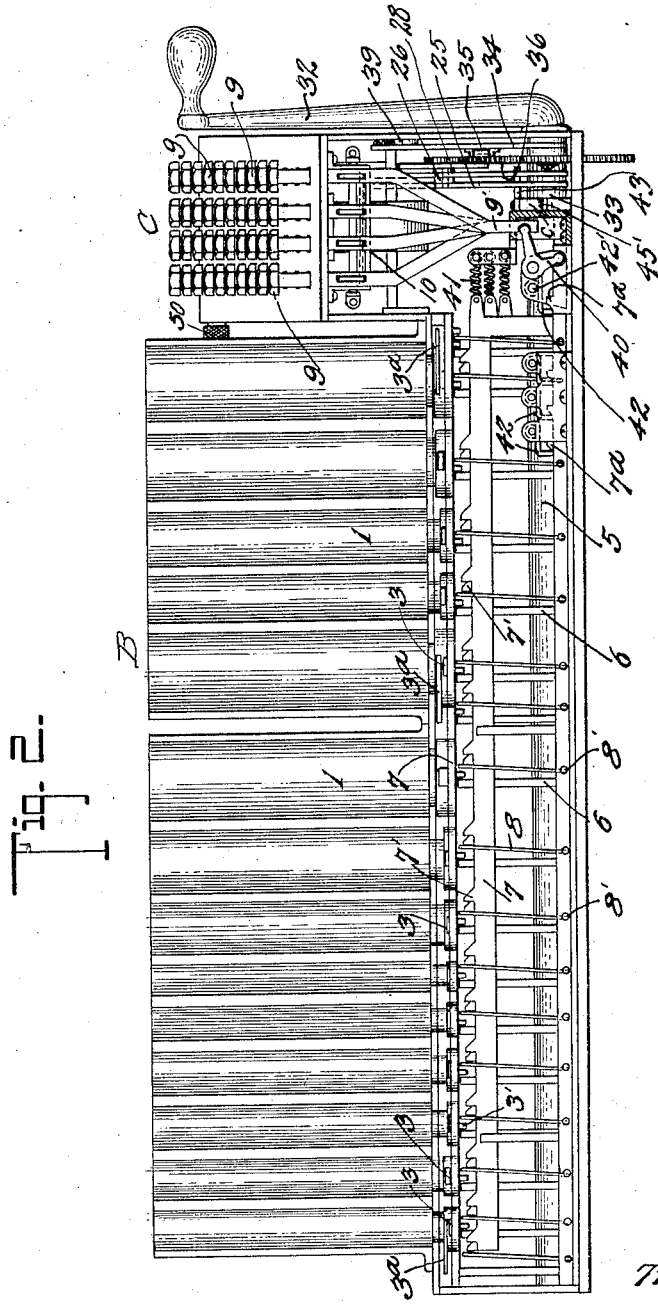

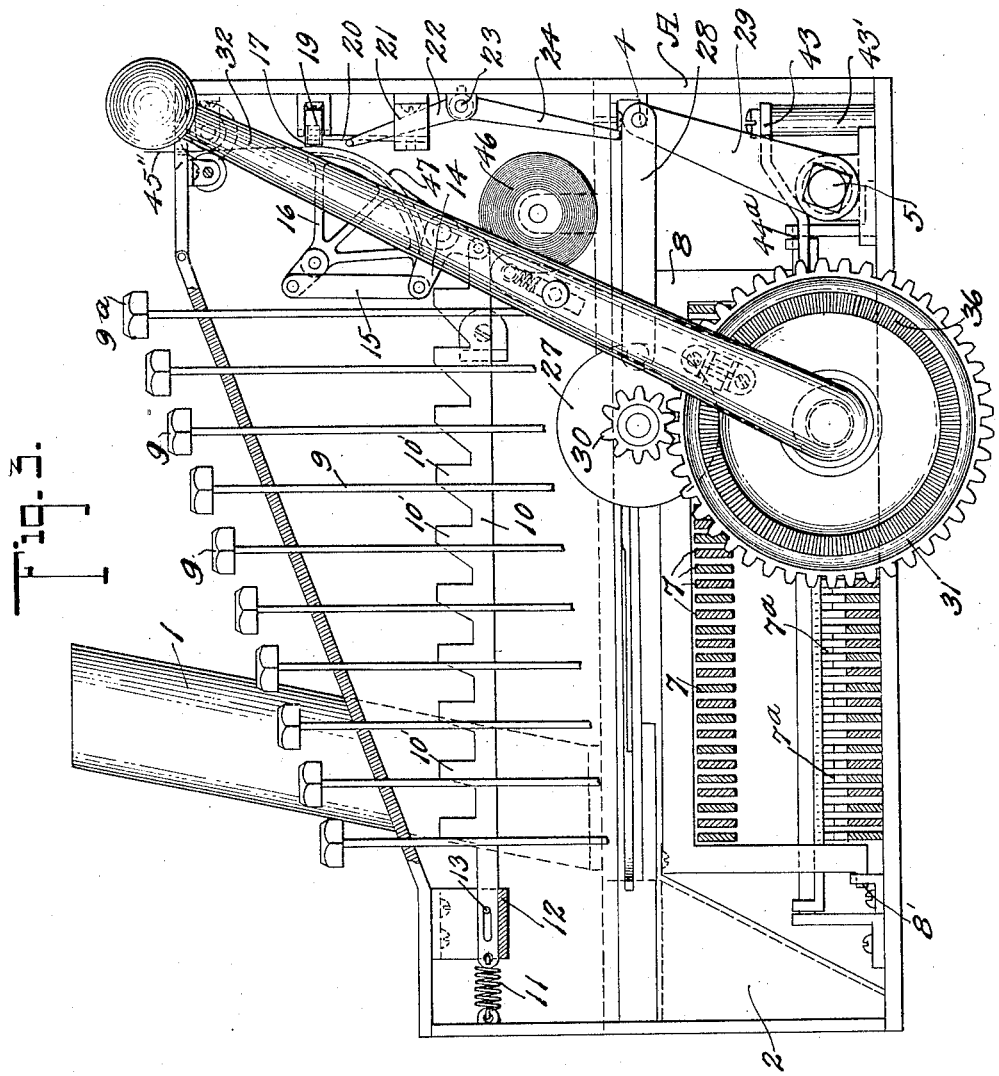

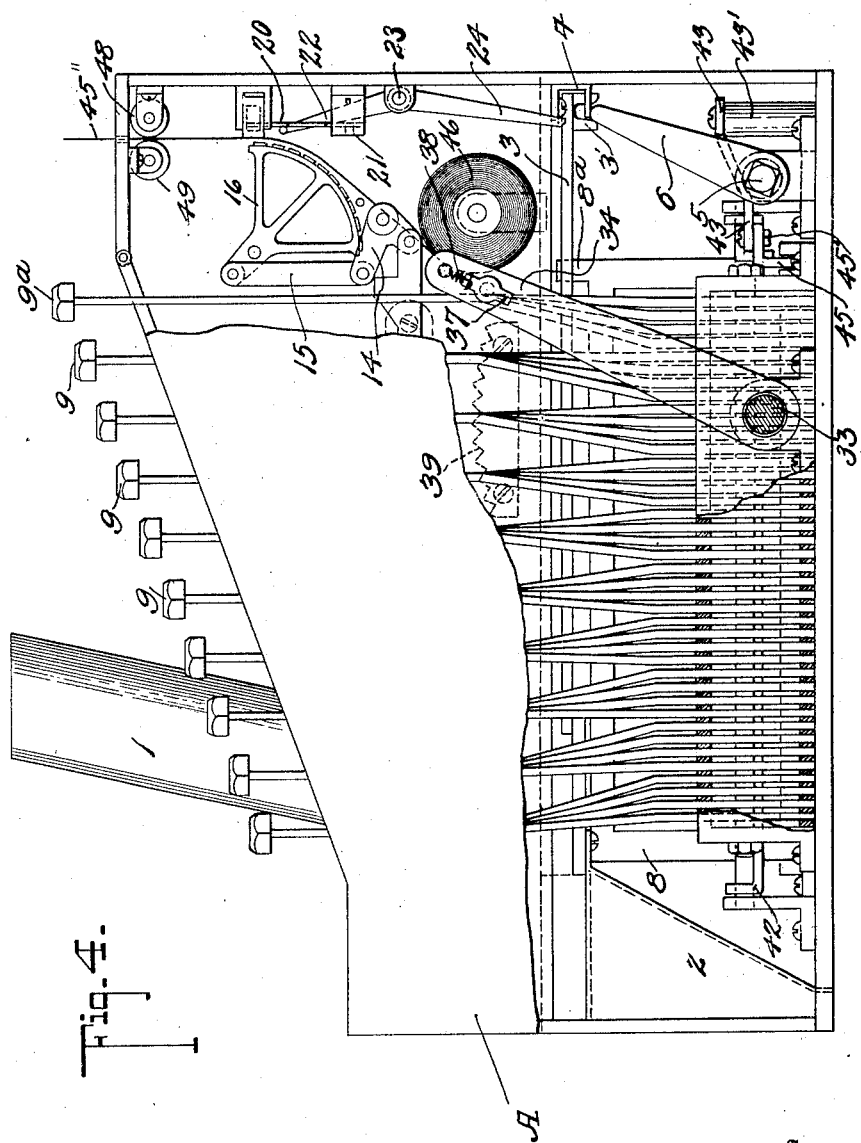

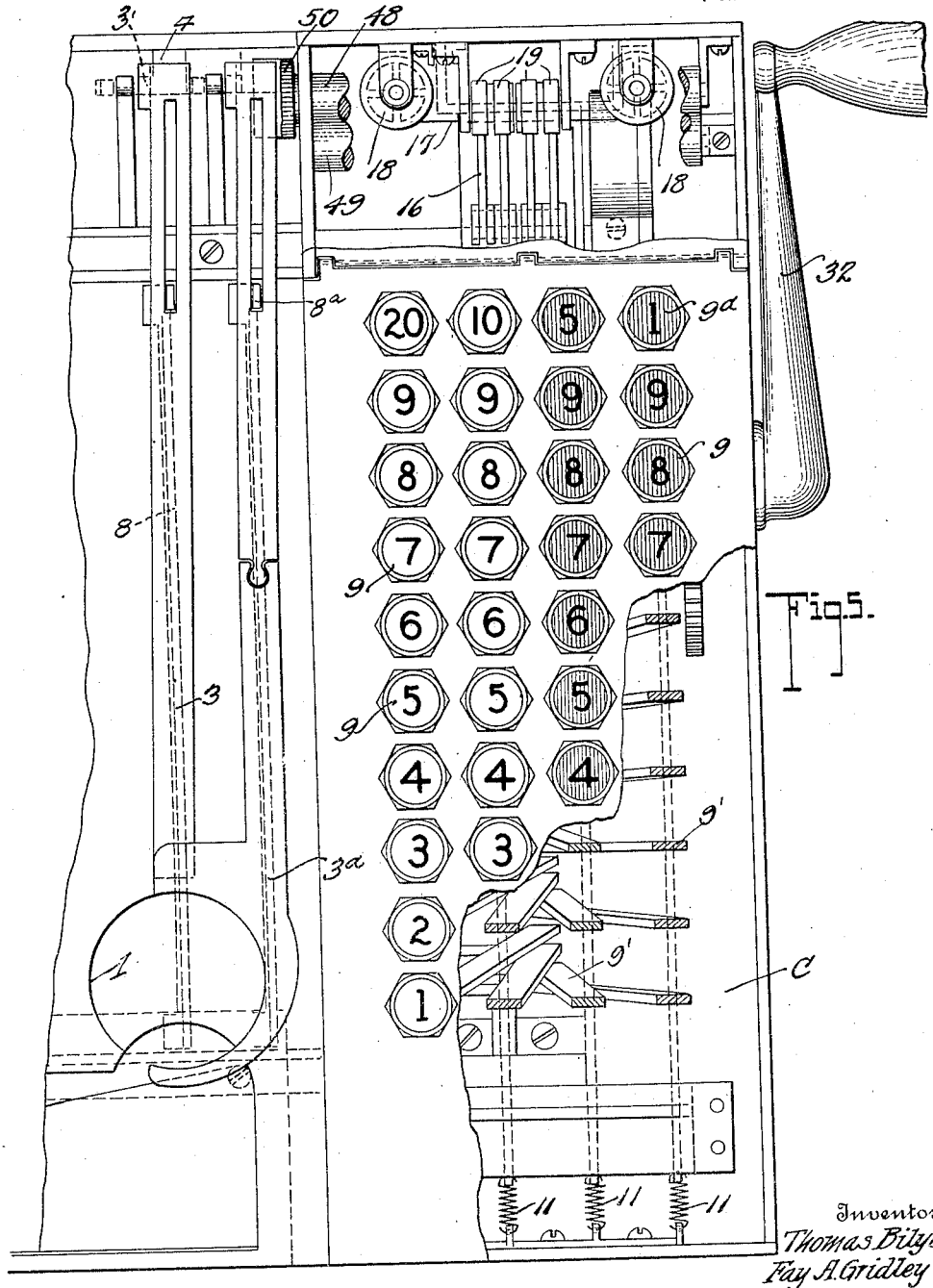

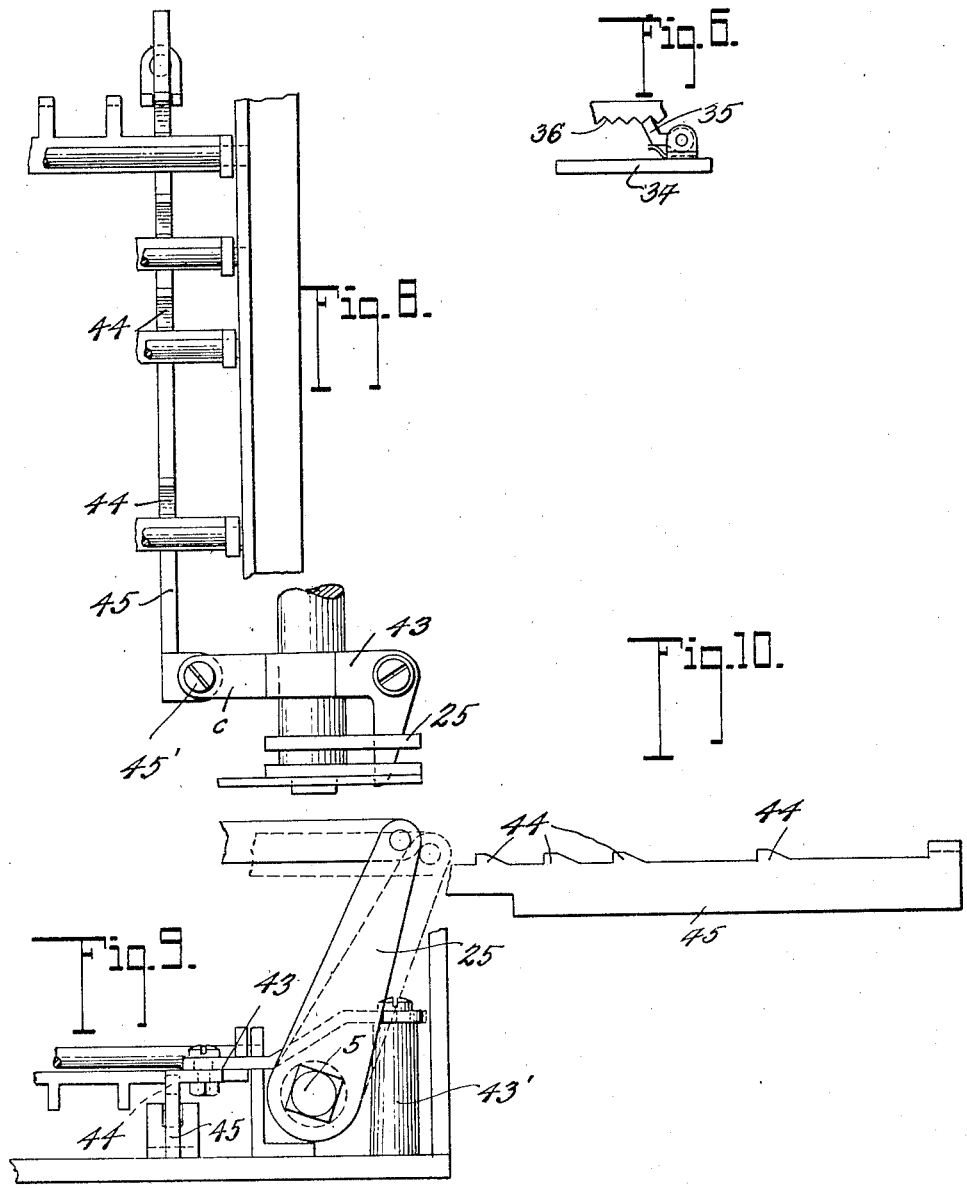

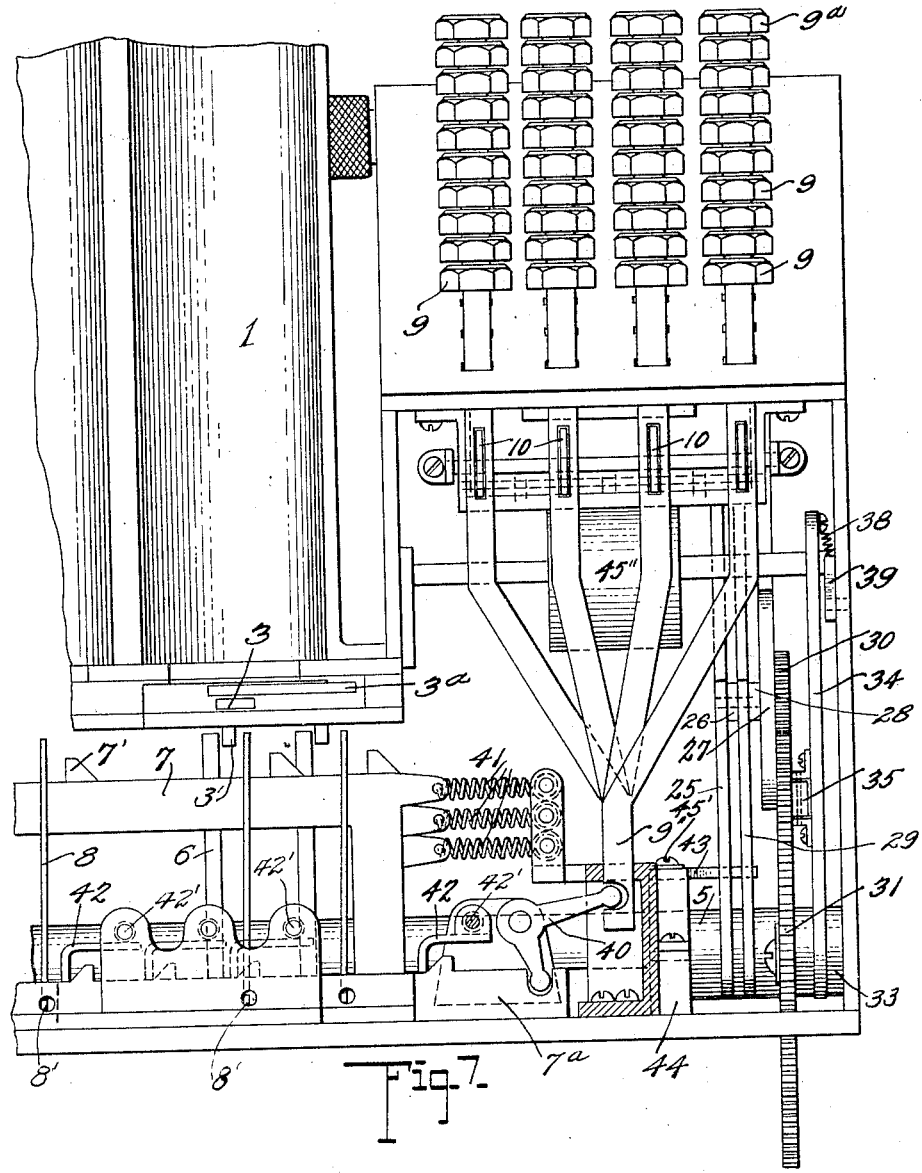

THOMAS BILYEU, OF HILLSBORO, AND FAY A. GRIDLEY, OF PORTLAND, OREGON.

MONEY-PAYING AND ACCOUNTING MACHINE.

1,329,748.

Specification of Letters Patent.

Patented Feb. 3, 1920.

Application filed March 13, 1915, Serial No. 14,181. Renewed April 28, 1919. Serial No. 293,340.

*To all whom it may concern:*

Be it known that we, THOMAS BILYEU and FAY A. GRIDLEY, citizens of the United States, residing at Hillsboro, Washington county, and Portland, Multnomah county, respectively, and State of Oregon, have invented certain new and useful Improvements in Money-Paying and Accounting Machines, of which the following is a specification.

This invention comprises a money paying and listing machine.

In the practical embodiment of said machine it is contemplated to employ an accounting or calculating section including suitable manipulative keys operable to control, adjust, or index the calculating or accounting devices, which in the present instance are type carriers, all somewhat after the manner of an ordinary adding and listing machine. The printing or final operation of said accounting devices is effected after they are indexed for the item of the particular transaction of the machine by means of a main actuator such as a handle having suitable driving connections, the keys being automatically restored through the medium of the actuator aforesaid.

This invention resides broadly in combining with accounting machine instrumentalities such as described, a money paying section or mechanism characterized in that the money ejecting devices thereof are controlled initially according to the amount of an item set up on the amount keys of the accounting section, whereby said ejecting devices will at the proper time discharge from the machine money equivalent to the amount of said item. The discharge, however, takes place when the main actuator is operated owing to the provision of driving connections intermediate the actuator and the ejector mechanism. It is notable that the last named driving connections are such that by ready detachment they may be rendered inoperative so that a discontinuance of the paying out of money may be obtained, while the essential parts of the accounting section remain completely operative. In other words, notwithstanding the incapacitating of the paying mechanism to perform its money ejecting functions, the construction of this machine is especially advantageous in that the accounting or calculating section is perfectly serviceable always, in fact susceptible of use distinct and separate, functionally speaking, from the paying section. Thus it is that should it be desired by the operator to disable the money ejecting instrumentalities, the driving connection between the main actuator is dis-established, and then the keys may be operated in performing transactions on the machine and the items or amounts predetermined in this way will be recorded or printed when the actuator or handle is moved properly. Under these conditions a complete accounting machine is provided.

It is deemed important to this invention that the keyboard mechanism be of the decimal system type with groups of keys numbered "1" to "9" inclusive, for otherwise effective combinations in mechanical calculation or accounting would be attenuated, rendering much less adequate the capacity of the machine for handling the listing or accounting, and the paying out of amounts limited in the present machine by its maximum capacity alone.

More specifically speaking the invention involves peculiar printing mechanism for listing or recording items, the same comprising pivotally operating type carriers and novel striking hammers with special means to control the action of the latter.

The invention also includes a special construction of main actuator in the form of a handle, there being provided ratchet and gear devices intermediate the handle and main driving shaft whereby to effect operation of the listing and paying mechanisms.

Certain novel key locking instrumentalities are employed for holding the keys depressed with the type carriers indexed, as a preliminary to the operation of the listing and ejecting devices. The locking means coacts directly with lock mechanism intermediate the keys and ejectors.

In addition to the regular keyboard there are provided special keys coöperative with the money paying mechanism whereby certain special amounts may be readily discharged from the machine.

A complete understanding of the invention will be had upon reference to the following detailed description and to the accompanying drawings in which:—

Figure 1 is a plan view of a machine built in accordance with the invention, the top of the casing for the money paying section being partly broken away to bring out clearly the ejecting and selector devices.

Fig. 2 is a front elevation of the same, the front wall of the casing being omitted to clearly illustrate interior parts.

Fig. 3 is an end view of the machine shown partly in section, but with the main actuator or handle mechanism included.

Fig. 4 is an end and partly sectional view, the end wall of the casing broken away and the formation of the keys at their lower portion fully illustrated.

Fig. 5 is an enlarged view showing more particularly the keyboard section of the machine, the top of the casing broken away to disclose certain interior parts.

Fig. 6 is a detailed view showing more clearly the ratchet connection between the auxiliary actuating arm and the ratchet and gear wheel.

Fig. 7 is an enlarged broken view looking toward the front of the machine illustrating more clearly the details of construction.

Fig. 8 is a plan view of the key released devices.

Fig. 9 is an end view of the same.

Fig. 10 is a detail view of the release slide.

*Money paying mechanism.*

A in the drawings denotes the casing of the machine and for the purposes of this description said casing, as well as the mechanical parts of the machine, comprises the money paying section B and the accounting, calculating or listing section C. The money paying section B contains the devices for selecting and discharging coins disposed in a series of coin holders 1 located at the front portion of the section B and from which the coins are adapted to be ejected one by one, or in some instances two at a time, into a discharge chute 2 which is common to all of the holders. The coin holders are of tubular form open at their front portions and provided with laterally intersecting openings adjacent to their base portions through which openings operate the front ends of the ejectors 3, said ejectors being disposed transversely of the machine and each adapted for lengthwise movement. The ejectors are furthermore so mounted that they may be moved laterally in the plane of their lengthwise or ejecting movement for the purpose of rendering them operative or inoperative as required. Normally the ejectors are in the positions shown in Fig. 1, their rear ends each being provided with a lateral and downwardly bent projection 3' having a bifurcation to receive a lug on a bracket 4 attached to the rear wall of the casing whereby the coacting ejector is locked from ejecting movement. Disposed lengthwise of the machine near its rear portion is an ejector shaft 5 having a plurality of ejecting arms 6 fixed thereto, one arm for each ejector. The upper end of each arm 6 is capable of engaging in the bifurcation of the lug 3' when the coacting ejector is moved laterally at its rear end to a position above the arm 6, being then disengaged, of course, from the bracket 4 and free to be moved outward.

The mechanism employed to shift the ejectors laterally at their rear ends to selectively interlock the parts 3' and 6 includes a plurality of selector bars or frames 7 supported by the base of the paying section B and having projections 7' adapted to engage with selector bails 8 which are pivotally mounted beneath the ejectors and substantially in alinement therewith, the point of pivotal support being shown at 8'. Each bail 8 is provided at its rear end (see Fig. 4) with a vertical lug 8ª which passes through a longitudinal slot 3' of the coacting ejector. Thus it is that each selector bar 7 being supplied with one or more projections 7' adapted to engage one or more bails 8, when moved lengitudinally will swing such bail or bails in an obvious manner. The movement of the bail or bails 8, owing to the interlocking of the lugs 8ª with associated ejectors 3, will move the ejectors laterally in the plane of their ejecting movement to interlock the rear ends of the ejectors with the arms 6 adjacent thereto.

Assuming the provision of suitable mechanism to be hereafter described, for longitudinally moving the selector members 7, and thus interlocking the ejectors 3 with coacting arms 6 on the ejector shaft, it will be evident that if the shaft 5 is then rocked those of the ejectors 3 interlocked with the arms 6 will be moved lengthwise so that their front ends enter the space at the base portion of the associated coin holders 1 and by engagement with the lowermost coin or coins in said holders the money will be discharged into the chute B and thus dispensed from the machine.

The foregoing generally describes the money paying mechanism.

*Calculating or accounting mechanism.*

The above mechanism is located, of course, in the calculating or accounting section C of the machine which is really the keyboard section. Referring to Figs. 3 and 4 especially it will be noted that four rows of amount keys 9 are employed, each row including keys numbered from "1" to "9" inclusive, the key arrangement being very similar to the ordinary arrangement of amount keys of adding or calculating machines where the keyboard mechanism is of the decimal system type. After a complete understanding of the operation of the accounting mechanism is had, it will be appreciated that by merely adding rows of keys and coacting parts, to the keyboard mechanism the capacity of the machine may be correspondingly increased. There is provided (see Fig. 3) an indexing bar 10 for each row of keys 9, said indexing bar being formed with cam lugs 10', one lug for each key. The cam or inclined edge portions of the lugs 10' vary in inclination and each bar 10 passes through slots provided in the keys of the row with which the bar is associated. Springs 11 connected with the front ends of the bars 10 normally tend to pull said bars to the forward extreme of their movement as guided by a suitable bracket 12 and a guide bar 13 which passes through transversely alined slots in the bars 10. At its rear end each bar 10 is pivotally connected with a bell crank 14 and each bell crank is connected by a link 15 with a type carrier 16. The type carrier 16 is provided with at least nine types numbered respectively from 1 to 9 inclusive, and a printing ribbon 17 operates horizontally and transverse to the planes of movement of the type carriers, being adapted to wind and unwind in respect to suitable spools 18 supported by the rear wall of the casing A on any suitable bracket attached to the latter. A type hammer 19 is provided for each type carrier 16 and is supported by a spring 20, the several springs 20 being attached to a supporting bracket 21 (see Figs. 3, 4 and 5). A controlling bail 22 is mounted pivotally at 23 on the rear wall of the casing A and its cross piece engages the springs 20 at the front sides of the same. One of the sides of the bail 22 is formed with a downwardly extending arm 24 disposed in the path of an arm 25 loosely pivoted to the rock shaft 5 and connected by a link 26 with a drive wheel 27. Another link 28 connects the wheel 27 with another arm 29 on the shaft 5, the arms 25 and 29 being substantially the same excepting that the latter is fixed to the shaft 5 and not loose as is the former. The wheel 27 is adapted to be rotated by the provision of a pinion 30 fixed thereto and meshing with a combined gear and ratchet wheel 31 with which the handle 32 is connected.

*Main actuator.*

The handle 32 is the main actuator for the machine and is carried by a short shaft 33 to which the gear wheel 31 is fixed. The shaft 33 carries an auxiliary arm 34 virtually in alinement with the handle but located within the casing A at the keyboard end of the machine. This auxiliary arm 34 is provided with a ratchet pawl 35 coöperative with a circular series of ratchet teeth 36 on the gear wheel 31. The relative sizes of the pinion 30 and gear wheel 31 are such that a complete forward stroke of the handle 32 from its normal rearmost position of Fig. 3 will cause a complete revolution of the wheel 27, thereby moving the arms 25 and 29 forward and rearward, or giving them a complete forward and rearward stroke. A full forward stroke of the handle 32 is compelled by the employment of suitable full stroke mechanism, shown in dotted lines in Figs. 3 and 4. This mechanism preferably consists of a full stroke dog 37 loosely rockable on the outer side of the auxiliary arm 34 actuated by the spring 38 and coöperative at its lower end with the teeth of the rack 39 which is attached to the inner face of the adjacent end wall of the casing.

*Key locking mechanism.*

Certain movement of the selector members 7 by which they set the ejectors 3 in operative positions in relation to the arms 6 of the ejector shaft 5 has been mentioned. This movement is effected through the medium of the amount keys which, as seen in Figs. 2 and 4, extend downward almost to the bottom of the casing A, the lower end portions 9' of the keys being bent toward one another so as to operate in alinement. At its lower end each key 9 is interlocked with an arm of a bell crank 40 the other arm of which is interlocked with an extension 7ª of a coöperative selector member 7. The selector members 7 are normally acted on by springs 41 which are attached to a stationary bracket at one end and secured at their other ends to the selector members. The springs 41 tend to hold the selector members 7 at the rightward limit of their movement, as seen in Fig. 2, but it will be evident that upon depressing one or more keys, through the medium of the bell cranks 40 the movement of the keys is transmitted to the coacting selector members 7 and associated ejectors 3 are made operative in the manner previously referred to. The keys 9 are locked depressed and the selectors and ejectors actuated thereby held in operated positions by means of locking bars 42 pivotally mounted as at 42' to suitable supports on the base of the casing A. As seen in Fig. 3 the selector members 7 are closely spaced together in side by side relation and it is contemplated to provide said members in series or groups corresponding with the series or groups of the keys, the groups of ejectors, and the groups of coin holders. Therefore a locking bar 42 is provided for each group or series of the selector members 7. At their lower portions the selector members 7 are formed with lugs 7ª which are adapted to be engaged by the locking bars 42. It is necessary that some means be utilized to disengage the bars 42 from the lugs 7ª to permit the normalization of the selector members 7 and ejectors 3, after a transaction of the machine. With this in view, while any suitable devices may be employed for the purpose, we preferably utilize a horizontal rocking lever 43 pivotally mounted on a post 43' adjacent to the ejector shaft 5. The lever 43 is angle-shaped and has it front end connected with an end of a release slide 45 at 45'. The rear arm of the lever 43 extends behind the arm 25. As the actuating arm 25 is returned to its normal position after a transaction of the machine through operation of the handle 32, said arm strikes the lever 43 rocking it toward the right end of the machine. This movement of the lever 43 pulls the release slide 45 longitudinally and through cams 44, the several locking bars 42 are raised out of locking engagement with respect to the lugs 7ª, thereby releasing the selector members 7 and the ejectors 3 which are interlocked therewith. The springs 41 restore the selector members when thus released. The cams 44 of the bar 45 are merely inclined lugs engaging beneath the rear ends of the locking bars 42 and adapted on actuation of said bars to raise the same out of coöperation with the selectors 7, permitting the latter to normalize and coacting parts to restore. The lever 43 is offset intermediate its ends to pass over shaft 5.

*Disabling means for the accounting mechanism.*

Reference has been made to the fact that the driving wheel 27 is connected by two different links 26 and 28 with the arms 25 and 29 respectively, the former loose on the shaft 5. The rocking of the shaft 5 and corresponding movement of the ejector arms 6 fixed to said shaft is imparted through the action of the link 28 and arm 29. The purpose of the arm 25 is solely to engage the lower extremity of the arm 24 of the detent bail 22 for the hammers 20 and by impingement with said arm 24 and escapement therefrom the bail 22 is caused to retract the hammers 19 and the release of the latter causes them to have impact with the type of the type carrier 16, thereby impressing said type on the paper tape 45'' which is fed upwardly from a spool 46 between the types of the type carriers 16 and a guide 47 in front of the springs 20 of the hammers 19. By detachment of the link 28 it will be seen that the driving connection between the wheel 27 and the arm 29 is eliminated notwithstanding that the corresponding connection between the parts 27 and 25 is undisturbed. The foregoing detachment will render the ejector shaft 5 inoperative when the main actuator 32 is operated and therefore the paying mechanism will be disabled at such time, the various instrumentalities of the calculating or accounting section C of the machine, however, being susceptible of operating in their normal manner.

*Money machine details.*

As seen in Fig. 1 the coin holders 1 are grouped so that commencing at the left hand end of the coin section the respective holders are designed to contain and pay out coins of the following denominations: First holder—pennies, with ejectors to pay out one cent or two cents; second holder— pennies, ejector paying out two pennies on each operation; third and fourth holders each contain nickels adapted to be ejected one at a time; fifth and sixth holders each contain dimes adapted to be ejected one at a time; seventh and eighth holders contain twenty-five and fifty cent pieces, respectively, to be ejected one at a time; the ninth holder contains silver dollars to be ejected two at a time; the tenth holder contains silver dollars to be ejected one or two at a time; the eleventh and twelfth holders contain five and ten dollar gold pieces, respectively, to be ejected one at a time; the thirteenth holder contains twenty dollar gold pieces to be ejected two at a time, and the fourteenth holder contains twenty dollar gold pieces to be ejected one or two at a time.

The ejector 3 for the second ninth and thirteenth coin holders 1, counting from the left as before, are of double thickness and hence each time such ejectors are operated they act to discharge from the associated holder 1 two coins, thus making a double payment. The first, tenth and fourteenth holders are designed for single or double payment purposes for which reason two ejectors are associated with each of said holders. One of these ejectors 3 is of practically the same form as the other ejectors used but for effecting double payment and controlling the single payment an auxiliary ejector 3ª is employed, the same operating in a plane above that in which the associated ejector 3 operates and being adapted to engage the second coin from the bottom of those stacked in the particular holder 1. The ejector 3ª is made in sections, the front section being pivotally connected at 3ᵇ with the rear section which is formed similar to the rear end portions of the ejectors 3. The ejector 3ª is supplied with a finger 3ᶜ of curved form extending in front of the second coin from the bottom in the stack and with another finger 3ᵈ extending laterally in rear of said coin. Referring to Fig. 1, when a single penny is to be discharged, as controlled for instance by the depression of the "1" key of the units row of the keyboard, the ejector 3 of the first coin holder 1 is rendered operative and later actuated, the ejector 3ª remaining stationary and thus detaining the second coin from the bottom in the holder 1, the bottom coin, of course, being discharged. When a double payment from the first penny coin holder is required both of the ejectors 3 and 3ª of said holder are interlocked with the shaft 5, or rendered operative, and therefore, when later actuated so their front ends move outward, obviously both the lowermost and the second from the bottom coins of the holder will be discharged into the chute 2. With the above arrangement, a comparatively small number of coin holders are employed from which may be delivered money of any amount between the minimum and maximum capacities of the machine.

*General operation of entire machine.*

Suppose that it be desired to eject from the machine a single penny and list up said amount on the recording tape 45, the key 1 of the units or right hand row of the keyboard amount keys 9 will be depressed. The portion of said key opposite the cam lug 10' at the front end of the units indexing bar 10, see Fig. 3, will be engaged by said key and moved rearward one increment of movement, the degree of movement being determined by the inclination of the cam portion of the lug 10'. Through the connections 14 and 15 the indexing bar indexes or positions the units type carrier 16 so that the type 1 on the arc portion thereof is opposite the printing ribbon 17 and the units type hammer 19. Simultaneously with the setting of the type carrier 16 by the key above mentioned said key, through the bell crank connection 40 at its lower end moves the selector member 7 coöperative therewith, which selector member has a single lug 7' engageable with the bail 8 interlocked with the ejector 3 of the first penny holder 1, the ejector being thus moved into engagement with its ejector arm 6. The printing mechanism is now indexed to print "1" on the recording tape 45" and the paying mechanism is adjusted for the ejection of one cent from the first penny holder 1. The operator now grasps the handle 32 and pulls the same forward to the end of the compelled full stroke, thereby actuating the drive wheel 27 and imparting a complete forward and rearward stroke to the arms 25 and 29. The arm 29, of course, operates the ejector shaft 5 and the arm 25 trips the arm 24 of the detent bail 22 of the hammers 19; thus the ejector shaft is operated during the forward movement of the handle 32 to discharge one cent, and the hammers are freed so that the item one cent will be printed on the recording tape 45". When the handle is restored to its normal position the arm 25 strikes the lever 43 and disengages the coacting locking bar 42 from the selector member 7 previously locked on the depression of any key, thereby restoring the selector, ejector and type carrier instrumentalities to normal. The tape 45" passes upward through a slot 45ᵃ in the casing A between two rolls 48 and 49, the roll 48 having its axis projecting to a point exterior to the casing and supplied with a knurled knob 50 by which the roll may be manually operated to feed upward the tape, though if desired mechanical means may be employed controlled from the main actuator of the machine, a common expedient in this art, to feed the tape 45" away from the printing mechanism after each transaction of the machine.

To discharge and list according to a transaction to the amount of $4.32 the "4" key 9 of the hundreds row, the "3" key 9 of the tens row, and the "2" key 9 of the units row of the keyboard will be depressed. Depression of said units key causes two increments of movement of the cam of its indexing bar 10, the inclination of the cam lug 10' for said key being twice as great as the inclination of the cam lug 10' for the penny key. In this manner the units type carrier 16 is moved two increments of movement and indexes the type "2" opposite the printing point. Likewise the depression of the said tens key causes three increments of movement of its indexing bar and the associated type carrier, and the depression of the hundreds key causes four increments of movement of the corresponding part. Selector members 7 properly connected with the particular keys depressed will be actuated on indexing the type carriers to select or render operative the necessary ejectors, which on subsequent movement will discharge into the chute 2 the amount of $4.32, said amount being made up of two silver dollars discharged from the permanent double payment silver dollar holder 1, two silver dollars from the other silver dollar holder 1, a twenty-five cent piece from the proper holder, a nickel ejected from one of the nickel holders, and two pennies ejected from one of the penny holders.

Owing to the provision of the detachable link 28, whenever it is desired to employ the accounting or calculating section C of the machine alone, the removal of the member 28 or disconnection of the same either from the arm 29 or the wheel 27 will render the paying instrumentalities inoperative to perform their functions. Under these conditions a machine built in accordance with the invention may be said to comprise practically two machines, namely a combined money paying and accounting machine, and a complete accounting machine alone.

There is provided a special set of keys 9ᵃ in the keyboard for the ejections of special amounts. The amounts here shown are one dollar, five dollars, ten dollars and twenty dollars. It is to be understood, however, that these are arbitrary amounts only. These keys operate as follows: controlling the last four selector bars in the rear of the machine.

For example, if the one dollar key, as here shown, is depressed the selector bar would place in position the ejector bar for a fifty cent coin, a twenty-five cent coin, two ten cent coins and one five cent coin; thus one dollar in change would be ejected from the machine. If the five dollar key is depressed in addition to the above enumerated coins for the one dollar in change, the ejector bars for four one dollar coins would be ejected by the operation of the machine. When ten dollars is required a five dollar coin would be added to that for the five dollars in change. When twenty dollars is required in change a ten dollar coin a five dollar coin, four dollar coins, one fifty cent coin, one twenty-five cent coin, two ten cent coins and one five cent coin would be ejected by the selector bars placing in position the ejector bar for the enumerated coins.

Having thus described the invention, what is claimed is:—

1. In a money handling machine, the combination of keyboard mechanism including keys, ejectors, an actuating handle for the ejectors, money holders with which the ejectors are associated, selector bars coöperative with the ejectors, operating means between the keys and the selector bars, and locking means adapted to directly engage with the selector bars for holding the same in ejector selecting positions, and means whereby to release the selector bars from said locking means and operable incident to movement of said actuating handle.

2. In a money handling machine, the combination of keyboard mechanism including keys, ejectors, money holders with which the ejectors are associated, selector bars coöperative with the ejectors, operating means between the keys and the selector bars, a plurality of locking devices adapted to engage the selector bars to lock the same in positions assumed thereby after actuation, a main actuator for the ejectors, and means intermediate said locking devices and the main actuator whereby to release the selector bars from the locking devices during the operation of said actuator.

3. In a money handling machine, the combination of keyboard mechanism including keys, ejectors, money holders with which the ejectors are associated, selector bars coöperative with the ejectors, operating means between the keys and the selector bars, for setting the selector bars in ejector selecting positions, locking means engageable with the selector bars to hold the same in said selecting positions, the locking means comprising a plurality of locking bars, a release slide coöperative with all of said bars, a main actuator, and means intermediate the main actuator and the release slide for operating the latter.

4. In a money handling machine, the combination of keyboard mechanism including keys, ejectors, money holders with which the ejectors are associated, selector bars coöperative with the ejectors, operating means between the keys and the selector bars, a main actuator for operating the ejectors, a plurality of locking devices coacting with the selector bars to hold the latter and the keys in actuated positions, a slide adapted to engage said locking devices, and means for operating said slide from the main actuator whereby to release the locking devices and restore the selector bars and keys.

5. In a money paying machine, keyboard control mechanism comprising keys, ejectors, money holders associated with the ejectors, selector means intermediate the ejectors and keys operable from the latter, means to lock the selectors, ejectors and keys in set positions for paying out a predetermined amount of money, comprising locking devices each associated with a predetermined number of said parts, a slide having cam means coöperative with the several locking devices to release the latter and restore the selectors, ejectors and keys, a main actuator, and means to operate said slide from the main actuator.

6. In a money handling machine, the combination of keyboard mechanism including keys, ejectors, money holders with which the ejectors are associated, selector bars coöperative with the ejectors, operating means between the keys and the selector bars, the money holders, selector bars and keys being arranged in groups corresponding with one another, and locking bars one provided for each group of selector bars and engageable therewith to hold the selector bars, ejectors and keys in operated positions, and a main actuator for the ejectors.

7. In a money handling machine, the combination of keyboard mechanism including keys, ejectors, money holders with which the ejectors are associated, selector bars coöperative with the ejectors, operating means between the keys and the selector bars, the money holders, selector bars and keys being arranged in groups corresponding with one another, and locking bars one provided for each group of selector bars and engageable therewith to hold the selector bars, ejectors and keys in operated positions, a main actuator for the ejectors, and means intermediate said main actuator and the locking bars for releasing the latter on the completion of a transaction of the machine.

8. In a money paying machine, the combination of money holders, ejectors associated therewith, rectilinearly operating selectors coacting with the ejectors, locking bars each engageable with a certain number of selectors to hold the latter in set positions, manipulative devices for setting the selectors, a main actuator coöperative with the ejectors, and a device common to the locking bars aforesaid for lifting the same out of engagement with respect to the selectors and thereby effect restoration of the selectors and coacting parts controlled thereby.

9. In a money handling machine, the combination of keyboard mechanism including keys, ejectors, money holders with which the ejectors are associated, selector bars coöperative with the ejectors, operating means between the keys and the selector bars, the money holders, selector bars and keys being arranged in groups corresponding with one another, and locking bars one provided for each group of selector bars and engageable therewith to hold the selector bars, ejectors and keys in operated positions, a main actuator for the ejectors, means intermediate said main actuator and the locking bars for releasing the latter on the completion of a transaction of the machine, accounting mechanism comprising type carriers, means operable by the keys for setting the type carriers to the printing point, hammers coöperative with the type carriers, means for actuating said hammers operable from the main actuator, an operating connection between the main actuator and the ejectors, and means for disabling the last mentioned connection whereby the accounting mechanism may be controlled and operated by the proper instrumentalities mentioned while the paying mechanism is rendered inoperative for paying out money.

10. In a money handling machine, the combination of money holders, ejectors therefor, keyboard mechanism embodying keys, selector mechanism intermediate the keys and the ejectors, and operating means for said ejectors comprising a main actuator movable in a plurality of directions, an operating shaft, a driving wheel having link connection with said shaft, a pinion connected with the driving wheel, a gear meshing with said pinion, and means to operatively connect the main actuator with the gear during movement of the said actuator in one direction only.

11. In a money handling machine, the combination of money holders, ejectors therefor, keyboard mechanism embodying keys, selector mechanism intermediate the keys and the ejectors, and operating means for said ejectors comprising a main actuator, an operating shaft, a driving wheel having link connection with said shaft, a pinion connected with the driving wheel, a gear meshing with said pinion, and a pawl and ratchet connection intermediate the main actuator and said gear.

12. In a money paying machine, the combination of money holders, ejectors associated therewith, selectors for setting the ejectors for operation, a main actuator, an ejector shaft connected with the ejectors, loose and fixed arms on said ejector shaft, driving connections intermediate said arms and the main actuator, accounting mechanism, means for operating the accounting mechanism from the said loose arm, and means for disconnecting the fixed arm from the main actuator, substantially as set forth.

13. In a money handling machine, the combination of keyboard mechanism including amount keys, accounting mechanism comprising type carriers controlled by said keys, hammers coöperative with said carriers, paying mechanism including ejectors, an ejector shaft, operating mechanism consisting of a main actuator, arms one of which is loosely mounted on the ejector shaft while the other is fixed to said shaft, separate driving connections between said arms and the main actuator, means operable by one of said arms for actuating the hammers to cause impression operation of the type carriers, and means whereby the driving connection between said fixed arm and the actuator may be rendered inoperative to permit the accounting mechanism to be controlled and operated by the main actuator independently of the paying mechanism.

14. In a money paying machine, the combination of money holders, ejectors associated therewith, manipulative devices controlling the action of said ejectors, a main actuator, an ejector shaft, arms carried by said shaft, one fixed and one loose thereon, a detachable connection between the fixed arm and the main actuator, accounting mechanism also controlled from said manipulative devices, a connection intermediate the main actuator and said loosely mounted arm, and means adapted to be impinged by said loosely mounted arm for operating the accounting mechanism at a predetermined time during the operation of the main actuator.

In testimony whereof we hereunto affix our signatures in the presence of two witnesses.

THOMAS BILYEU.
FAY A. GRIDLEY.

Witnesses:
JOHN L. BOZORTH,
WALTER T. McGUIRK.